(12) United States Patent
Rockwell (10) Patent No.: US 7,357,974 B2
(45) Date of Patent: Apr. 15, 2008

(54) MULTILAYER DENSIFIED SURFACE TO IMPROVE AIR FLOW RESISTANCE AND STRUCTURAL PROPERTIES

(75) Inventor: Anthony L. Rockwell, Pickerington, OH (US)

(73) Assignee: Owens Corning Intellectual Capital, LLCDE (US)

( * ) Notice: Subject to any disclaimer, the term of this patent is extended or adjusted under 35 U.S.C. 154(b) by 397 days.

(21) Appl. No.: 11/050,098

(22) Filed: Feb. 3, 2005

(65) Prior Publication Data

US 2005/0136235 A1 Jun. 23, 2005

Related U.S. Application Data

(63) Continuation-in-part of application No. 10/609,947, filed on Jun. 30, 2003, now Pat. No. 7,128,561.

(51) Int. Cl.
*B32B 7/02* (2006.01)

(52) U.S. Cl. ............... 428/212; 428/213; 428/218; 428/295.1

(58) Field of Classification Search ............... 428/212, 428/213, 218, 295.1
See application file for complete search history.

(56) References Cited

U.S. PATENT DOCUMENTS

| | | | |
|---|---|---|---|
| 3,773,605 A | 11/1973 | Pihlstrom | |
| 4,517,236 A | 5/1985 | Meeker et al. | |
| 4,539,252 A | 9/1985 | Franz | |
| 5,459,291 A | 10/1995 | Haines et al. | |
| 5,817,408 A | 10/1998 | Orimo et al. | |
| 5,824,973 A | 10/1998 | Haines et al. | |
| 6,109,389 A | 8/2000 | Hiers et al. | |
| 6,217,691 B1 | 4/2001 | Vair, Jr. et al. | |
| 6,358,592 B2 | 3/2002 | Vair, Jr. et al. | |
| 6,539,955 B1* | 4/2003 | Tilton et al. | 134/58 D |
| 6,669,265 B2* | 12/2003 | Tilton et al. | 296/146.1 |
| 2003/0003835 A1 | 1/2003 | Tilton et al. | |
| 2003/0008592 A1 | 1/2003 | Block et al. | |
| 2003/0039793 A1 | 2/2003 | Tilton et al. | |
| 2003/0068943 A1 | 4/2003 | Fay | |
| 2003/0106741 A1 | 6/2003 | Tompson et al. | |
| 2003/0199216 A1 | 10/2003 | Gomez et al. | |
| 2004/0002274 A1 | 1/2004 | Tilton | |
| 2004/0023014 A1 | 2/2004 | Williamson et al. | |
| 2004/0023586 A1 | 2/2004 | Tilton | |
| 2004/0065507 A1 | 4/2004 | Jacobsen | |
| 2004/0077247 A1 | 4/2004 | Schmidt et al. | |

FOREIGN PATENT DOCUMENTS

WO  WO 2004/013395  2/2004

* cited by examiner

*Primary Examiner*—Callie Shosho
*Assistant Examiner*—David J. Joy
(74) *Attorney, Agent, or Firm*—Inger H. Eckert; Maria C. Gasaway (57) ABSTRACT

A thermoplastic blanket includes multiple layers of thermoplastic material. The first such layer has a first surface zone, a second, optional surface zone and a first base zone between the first and second surface zones. The second layer of thermoplastic material includes a third surface zone, a fourth optional surface zone and a second base zone between the third and fourth surface zones. At least one surface zone of each layer is densified to a density of between about 1.5 to about 30.0 pcf while each base zone has a density of between about 0.5 to about 10.0 pcf.

20 Claims, 4 Drawing Sheets

Fig. 3h

MULTILAYER DENSIFIED SURFACE TO IMPROVE AIR FLOW RESISTANCE AND STRUCTURAL PROPERTIES

This application is a continuation-in-part of U.S. patent application Ser. No. 10/609,947, filed Jun. 30, 2003, now U.S. Pat. No. 7,128,561, which is hereby incorporated by reference in its entirety.

TECHNICAL FIELD AND INDUSTRIAL APPLICABILITY OF THE INVENTION

The present invention relates generally to thermoplastic blanket materials and, more particularly, to an apparatus for forming a densified surface layer on a thermoplastic blanket, to a method of processing a thermoplastic blanket and to a novel thermoplastic blanket material exhibiting a unique combination of physical characteristics.

BACKGROUND OF THE INVENTION

Thermoplastic blanket materials are well known in the art. Such materials have been utilized as acoustical and thermal insulators and liners for application to appliances and vehicles. These insulators and liners typically rely upon both sound absorption, i.e. the ability to absorb incident sound waves and transmission loss, i.e. the ability to reflect incident sound waves, in order to provide sound attenuation. They also rely upon thermal shielding properties to prevent or reduce the transmission of heat from various heat sources (e.g. engine, transmission and exhaust system), to the passenger compartment in vehicle applications.

Relatively higher density board products produced from thermoplastic blanket materials may be utilized as structural parts for appliances, office sound screen partitions, in hood liners, head liners and other automotive and truck applications.

The present invention relates to a novel apparatus for the production of thermoplastic blanket materials, a method of processing a thermoplastic blanket and a thermoplastic blanket product exhibiting a number of unique physical characteristics and properties that better adapt the final product to meet the needs of a number of product applications.

SUMMARY OF THE INVENTION

In accordance with the purposes of the present invention as described herein, an apparatus is provided for forming a densified surface layer on a thermoplastic blanket. That apparatus comprises a first continuous belt, a second continuous belt and a treatment zone defined between the first and second belts. In addition, the apparatus comprises a first heating and densifying unit, a second heating and densifying unit downstream from the first heating and densifying unit and a cooler downstream from the second heating and densifying unit.

A thermoplastic blanket feeder may be provided upstream from the first and second continuous belts. In addition a first facing feeder may be provided for feeding facing into the treatment zone between the thermoplastic blanket and the first belt. Still further the apparatus may include a second facing feeder for feeding a facing into the treatment zone between the thermoplastic blanket and the second belt.

More specifically describing the apparatus, the first heating and densifying unit includes a first platen, a cooperating second platen, means for heating said first platen, means for heating said second platen and means for displacing said first platen. Similarly, the second heating and densifying unit includes a third platen, a fourth platen, means for heating said third platen, means for heating said fourth platen and means for displacing said third platen. The cooler includes a cooling platen and/or a fan.

In one possible embodiment the first and second belts are constructed from polytetrafluoroethylene and, more specifically, closed weave polytetrafluoroethylene. In addition, the first and second continuous belts are constructed with an overlap splice. The platens utilized to heat the belts are constructed from aluminum.

In accordance with still another aspect of the apparatus, the means for heating the first platen includes a first variable electric heating circuit. That circuit includes watt densities in graduated steps of 13.7 watts per inch in the first 9 inches of the platen, and 11.85 watts in the next 20 inches of the platen, with 5.5 watts per square inch over the remainder of the platen. Similarly, the means for heating the second platen includes a second variable electric heating circuit. That second variable heating circuit includes watt densities in graduated steps of 13.7 watts per inch in the first 9 inches of the platen, and 11.85 watts in the next 20 inches of the platen, with 5.5 watts per square inch over the remainder of the platen.

In accordance with yet another aspect of the present invention, a method is provided for processing a thermoplastic blanket. That method includes the steps of continuously and simultaneously forming a densified surface layer on each of two opposing faces of a thermoplastic blanket having a density D prior to the forming and maintaining a core section of the thermoplastic blanket between the opposed densified surface layers at an increase in density of no more than about 0-40% and more typically about 0-15% of D following forming.

The method of processing a thermoplastic blanket may also be described as comprising the steps of continuously forming a densified surface layer on a face of a thermoplastic blanket and making the thermoplastic blanket with the densified surface layer to a desired thickness T within strict tolerances of ∀ 0.015".

Still further, the method of processing a thermoplastic blanket may be defined as comprising the steps of continuously forming a densified surface layer on a face of a thermoplastic blanket by densifying the densified surface layer up to about ten times from a starting density D 7within a time frame of between about 10-60 seconds while maintaining a section or base or core layer of the thermoplastic blanket at an increase in density of no more than about 0-40% and more typically about 0-15% of D following forming.

Still further, the method of processing a thermoplastic blanket may comprise the steps of introducing a thermoplastic blanket into a nip formed between two processing belts and applying heat and pressure to the thermoplastic blanket through the processing belts so as to form a densified surface layer on at least one face of the thermoplastic blanket.

More specifically, the method also includes the heating of the thermoplastic blanket along the face being densified to a thermoplastic polymer softening temperature of between about 180 to about 420 degrees F. For example, depending upon the type of copolyester binding fibers utilized, the blanket may, for example, be heated to a temperature of between about 210-250 degrees F. or even 325-375 degrees F. In addition the method includes the compressing of the thermoplastic blanket with a force of between about 0.5 to 10 pounds per sq. foot and the applying of heat and pressure for a duration of between about 10-60 seconds. Still further the method includes the cooling of the thermoplastic blanket below the softening temperature characteristic of material from which the thermoplastic blanket is constructed prior to releasing the pressure.

Still further, the method of processing a thermoplastic blanket may be described as comprising the introducing of a thermoplastic blanket into a nip formed between two continuous processing belts constructed of closed weave polytetrafluoroethylene with an overlap splice and the applying of heat and pressure to the thermoplastic blanket through the processing belts so as to form a densified surface layer on at least one face of the thermoplastic blanket.

In accordance with yet another aspect of the present invention, a thermoplastic blanket is provided comprising a first densified surface layer, a second densified surface layer and base layer between the first and second densified layers. That thermoplastic blanket is characterized by the first and second densified layers having a density of between about 1.5-30.0 pcf and, more typically 3.0-15.0 pcf and the base layer having a density of between about 0.5-10.0 pcf. The first and second densified surface layers may have a thickness of between about 0.01 to about 0.1 inches and the base layer has a thickness of between about 0.25 to about 4.0 inches.

In accordance with one embodiment of the present invention the thermoplastic blanket is formed from a polymer based thermoplastic material. That polymer based thermoplastic material is selected from a group consisting of polyester, polyethylene, polypropylene, polyethylene terephthalate, rayon, nylon and any mixtures thereof. The polymer based thermoplastic material may include fibers selected from a group consisting of glass fibers, natural fibers and mixtures thereof.

In addition, the thermoplastic blanket may include a facing layer on the thermoplastic blanket. That facing layer may be selected from a group consisting of polyester, rayon, metallic foil and mixtures thereof. Still further, for certain applications the thermoplastic blanket may include a first facing layer on a first face of the thermoplastic blanket and a second facing layer on a second face of the thermoplastic blanket.

In one possible embodiment, the base layer of the thermoplastic blanket is at least partially constructed from material selected from a group consisting of thermoset polymer material, fiber glass, foam, mineral fiber, cardboard and mixtures thereof.

The thermoplastic blanket may also be described as comprising a densified surface layer having a density of between about 1.5 to about 30.0 pcf and more typically about 3.0-15.0 pcf and a thickness of between about 0.01 to about 0.1 inches and a base layer having a density of between about 0.5 to about 10.0 pcf and a thickness of between about 0.25 to about 4.0 inches.

In the following description there is shown and described an apparatus and process for processing a thermoplastic blanket as well as a number of different embodiments of that processed blanket product which illustrate the present invention. As it will be realized, the invention is capable of other different embodiments and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiments of the invention, examples of which are illustrated in the accompanying drawing.

DETAILED DESCRIPTION OF THE INVENTION

Figure 1:
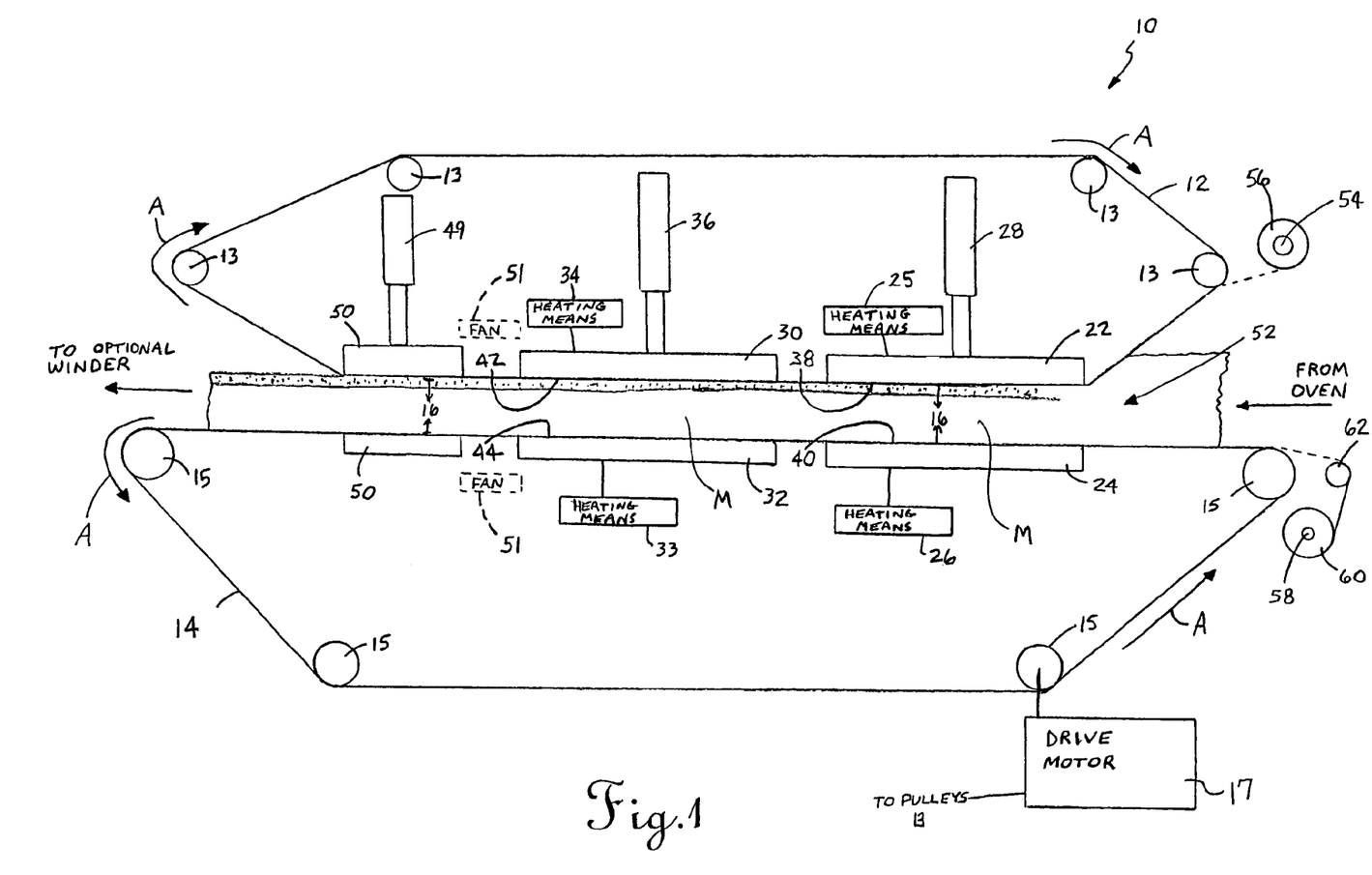
FIG. 1 is a schematical diagram of the apparatus of the present invention.

Reference is now made to FIG. 1 schematically illustrating the apparatus 10 of the present invention for forming a densified surface layer on a thermoplastic blanket material. The apparatus 10 includes a first or upper continuous belt 12 and a second or lower continuous belt 14. A treatment zone, generally designated by reference numeral 16, is defined between the two belts 12, 14. The belts 12, 14 are constructed from polytetrafluoro-ethylene and, more specifically, closed weave polytetrafluoroethylene. The belt material is about 0.0245 inches thick and has a gram weight of about 96.0 grams per square foot. The belt may have a width of, for example, ninety inches. Such a width is sufficient to process thermoplastic blanket material for most subsequent applications of the processed product.

Each of the continuous belts 12, 14 includes an overlap splice whereby the ends of the belts are overlapped and secured together by an adhesive. The closed weave polytetrafluoroethylene belt material and the appropriate adhesive for completing the overlap splice are available from a number of sources including, for example, Midwest Industrial Rubber of St. Louis, Mo. The belt 12 is driven in the direction of action arrows A by drive pulleys 13. The belt 14 is driven in the direction of action arrows A by drive pulleys 15. The drive pulleys 13 and 15 are driven by the drive motor 17 so that the belts 12, 14 are driven at the same speed.

As further shown in FIG. 1, the apparatus 10 includes a first heating and densifying unit, generally designated by reference numeral 18. A second heating and densifying unit, generally designated by reference numeral 20 is provided downstream from the first heating and densifying unit 18.

The first heating and densifying unit 18 includes a first platen 22, a second platen 24, means 25, 26 for heating those platens 22, 24 and a means 28 for displacing the platen 22.

The second heating and densifying unit 20 includes a third platen 30, a fourth platen 32, a means 33, 34 for heating the platens 30, 32 and a means 36 for displacing the platen 30.

More specifically, the first or upper platen 22 of the first pair of platens includes a heating face 38 in intimate contact with the rear face of the first continuous belt 12. The second cooperating platen 24 of the first pair of platens includes a heating face 40 in intimate contact with the rear face of the second belt 14. As shown, the platens 22, 24 are aligned across from each other so that the treatment zone 16 is partially defined between the platens 22, 24.

Similarly, the third platen 30 of the second pair of platens includes a heating face 42 in intimate contact with the rear face of the first belt 12 while the fourth platen 32 includes a heating face 44 in intimate contact with the rear face of the second belt 14. The two platens 30, 32 of the second pair of platens are aligned with each other and may be provided adjacent to the first pair of platens 22, 24 but downstream therefrom with respect to the direction of movement of the continuous belts 12, 14 (note action arrows A).

Each of the platens 22, 24, 30, 32 are constructed from aluminum so as to allow quick heating and rapid heat transfer into the belts 12, 14. In addition, the aluminum platens 22, 24, 30 and 32 resist warping, thereby maintaining dimensional stability which allows the production of a final product of desired thickness within relatively close tolerances. The platens 22, 24, 30 and 32 may, for example, be 1×48×96" with 4" gussets arranged to give an even heat transfer.

In the embodiment of the present invention illustrated in FIG. 1, the displacing means 28 is connected to the platen 22 and selectively displaces the platen 22 toward and away from the stationary platen 24. Similarly, the displacing means 36 is connected to the platen 30 and selectively displaces the platen 30 toward or away from the stationary platen 32. Together, the displacing means 28, 36 effectively allow an operator to control the dimension or height of the treatment zone 16 in order to allow the production of a final product of desired thickness as established by the distance between each pair of platens 22, 24 and 30, 32. While each pair of platens 22, 24 and 30, 32 are illustrated as having one displaceable and one stationary platen, it should be appreciated that both platens of each pair could be displaceable if desired.

Each of the platen heating means 25, 26, 33 and 34 may comprise a variable electric heating circuit. Such a variable electric heating circuit includes multiple electric heaters arranged in varying watt densities across the platens, each forming an independent heat control zone or area. The watt density of the heating zones of each platen is set up for 7-11.5 watts per square inch. Typically, the watt density of the leading edge zone of platens 22, 24 is 11.5 watts per square inch to provide for rapid heating of the belts 12, 14 and the thermoplastic polymer blanket being processed. The second, adjacent zone is designed for 9.5 watts per square inch, the third zone (i.e. the next one downstream) for 9.0 watts per square inch and the fourth or last zone is 7 watts per square inch. Advantageously, the variable heating circuits allow various areas of the platens 22, 24, 30 and 32 to be variably heated. For example, the upstream sections or areas of the first platens 22, 24 may be heated to higher temperatures (up to, for example, 600EF) in order to provide quick heating of the thermoplastic blanket material through the belts 12, 14. As a result, the thermoplastic blanket material quickly reaches its softening temperature. Downstream areas or zones of the platens 22, 24 and 30, 32 may be subjected to lower heat levels so that sufficient heat is provided to maintain the thermoplastic blanket material below the softening temperature but any overheating and energy waste is avoided.

As further shown in FIG. 1 the apparatus 10 also includes a cooler 50 downstream from the second heating and densifying unit 20. The cooler 50 may take the form of one or more cooling platens (with a liquid cooling system to maximize heat transfer) and/or one or more cooling fans 51 or any other appropriate structure or combination of structures capable of rapidly cooling the thermoplastic blanket material through the belts 12, 14 to a temperature above the softening temperature of the material prior to the thermoplastic blanket material leaving the treatment zone 16. Thus, the thermoplastic blanket material sets in its new, densified surface configuration before being relieved from the compression provided by the cooperating belts 12, 14. This ensures that the final product has a particular, predetermined thickness and this thickness may be maintained within very close tolerances. For example, the final product may have a thickness of between about 0.25 and about 4.0 ∀ 0.010 inches.

Where two cooling platens 50 are utilized, a means 49 is provided for displacing at least one of the platens 50 relative to the other so as to control the height dimension of the treatment zone 16 and as a consequence, the thickness of the final product.

In operation, the apparatus 10 of the present invention may be positioned in-line downstream from the oven (not shown) of a type known in the art utilized to form the thermoplastic blanket material and upstream from an optional winder (not shown) utilized to wind the thermoplastic blanket material onto a storage spool. Of course, no winder is utilized where a cut to length product is being produced. More specifically, the thermoplastic blanket material M is fed from the oven by a conveyor (not shown) and introduced into the nip 52 formed between the first and second belts 12, 14 which defines the entry to the treatment zone 16. The displacing means 28, 36 have previously been adjusted to define a treatment zone 16 of a selected span or height: that is, distance between the first and second belts 12, 14. As the thermoplastic blanket material M is fed by the belts 12, 14 into the treatment zone 16, the blanket material is simultaneously heated to temperatures between about 350 degrees F. and about 450 degrees F. and compressed with a force between about 0.5 pounds per square foot and 10 pounds per square foot by the first and second heating and densifying units 18, 20 for a period of time of between about 10-60 seconds. More specifically, the heating means 26 heats the first pair of platens 22, 24 and that heat is rapidly transferred through the belts 12, 14 into the surface layers of the thermoplastic blanket material. Similarly, the heating means 34 heats the second pair of platens 30, 32 to a desired temperature and that heat is transferred from those platens through the belts 12, 14 into the thermoplastic blanket material as it passes downstream through the treatment zone 16 through cooperating movement of the belts 12, 14 which are driven by the drive motor.

Prior to exiting the treatment zone 16, the thermoplastic blanket material is subjected to cooling by means of the cooler 50 so that the material of the blanket is brought to a temperature above its softening temperature. Accordingly, the blanket material sets in its new, densified condition prior to the release of compression. As such, the blanket material sets at the desired thickness within relatively close tolerance levels.

A number of different final products may be made with the apparatus 10 of the present invention. Examples of these thermoplastic blanket products are illustrated in FIGS. 2a-2d.

Figure 2A:
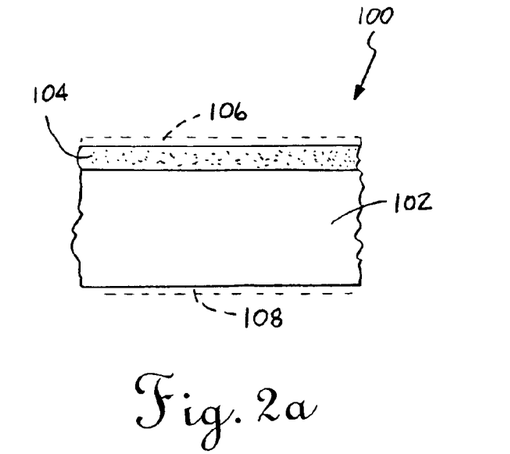
FIGS. 2a-2d are schematical illustrations of thermoplastic blanket material products of the present invention.
Figure 2B:
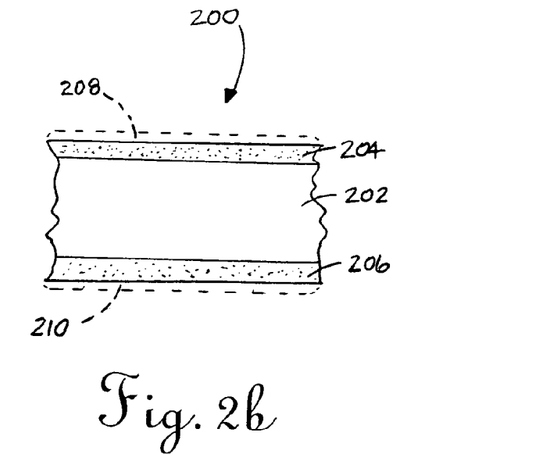

FIG. 2a discloses a thermoplastic blanket 100 having a relatively undensified base layer or core section 102 and a single, relatively densified surface layer 104. Such a product is processed in the apparatus 10 illustrated in FIG. 1 by passing the thermoplastic blanket material through the treatment zone 16 but only heating the material on one side thereof above the softening temperature of the material. Thus, the material could, for example, be heated along the upper face thereof as shown in FIG. 1 by means of the heating platens 22, 30. Alternatively, the heating could be performed on the opposite face of the blanket material by heating through the platens 24, 32.

An optional facing layer 106 may be added to the densified surface layer 104 or to the opposite face of the base layer as shown at 108. The facing layers 106 or 108 may be added as part of the in-line process. More specifically, as shown in FIG. 1, a first facing feeder 54 may be provided adjacent the first belt 12 to feed facing material from a supply roll 56 into the nip 52 at the entrance to the treatment zone 16. Similarly, a second facing feeder 58 may be provided adjacent the second belt 14. The feeder 58 holds a roll 60 of facing material and may include an idler or other tensioning pulley 62 to feed facing into the nip 52 leading to the treatment zone 16. The facing layers 106, 108 may include any appropriate adhesive to ensure good bonding to the thermoplastic blanket material.

Another thermoplastic blanket final product 200 is shown in FIG. 2*a*. The product 200 includes a base layer 202 of relatively undensified material sandwiched between a first densified surface layer 204 and a second densified surface layer 206. As should be appreciated, the two densified surface layers 204, 206 are continuously and simultaneously formed on the two opposing faces of the thermoplastic blanket 200. This is accomplished by heating the platens to the necessary temperature to transfer sufficient heat through the belts 12, 14 to soften the thermoplastic blanket material along the surfaces of that material in intimate contact with the belts. As the thermoplastic blanket material passes through the treatment zone 16 it is subject to compression. Prior to exiting the treatment zone, the material is cooled by means of the cooler 50 to a temperature below the softening temperature. This serves to set the thermoplastic blanket material and, particularly, the densified surface layers 204, 206 in the compressed condition and thereby produces a final product of desired thickness.

As noted above with respect to the product shown in FIG. 2*a*, the product 200 may also incorporate an optional facing 208 over the first densified layer 204 and/or an optional facing layer 210 over the second densified layer 206.

Figure 2C:
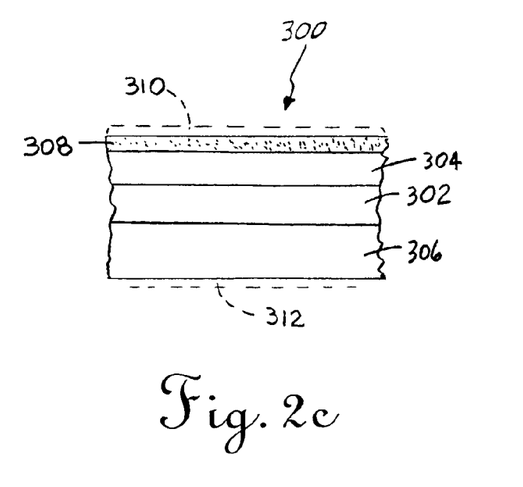

Yet another thermoplastic blanket product of the present invention is shown in FIG. 2*c*. This thermoplastic blanket product 300 includes a multi-layer base constructed from an inner layer 302 of thermoset polymer material, fiber glass, foam, mineral fiber, cardboard and mixtures thereof sandwiched between outer layers 304, 306 of thermoplastic blanket material. As shown in the FIG. 3 embodiment the product 300 may include a single densified surface layer 308. Still further, an optional facing layer 310 may be provided on the densified surface layer 308 and/or on the surface of the base layer 306.

Figure 2D:
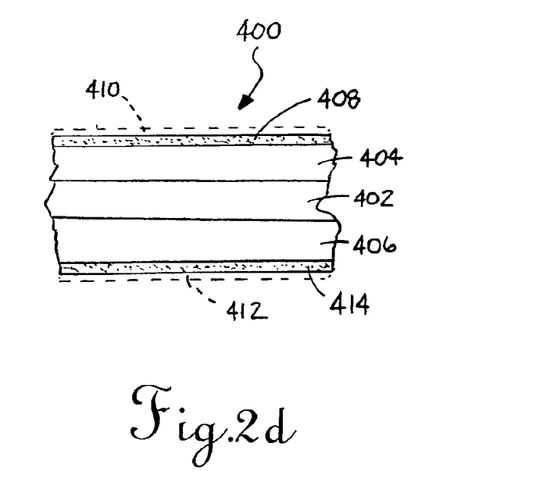

The thermoplastic blanket product 400 of FIG. 2*d* is similar to the product of FIG. 2*c* and includes the inner base layer 402 constructed from thermoset polymer material, fiber glass, foam, mineral fiber, cardboard and mixtures thereof, sandwiched between layers of thermoplastic blanket material 404, 406. A densified surface layer 408 is provided on the base layer 404 and a second densified layer 414 is provided on the thermoplastic blanket layer 406. Optional facings 410 and/or 412 may be provided on either or both of the densified surface layers 408, 414 as shown.

Figure 3A:
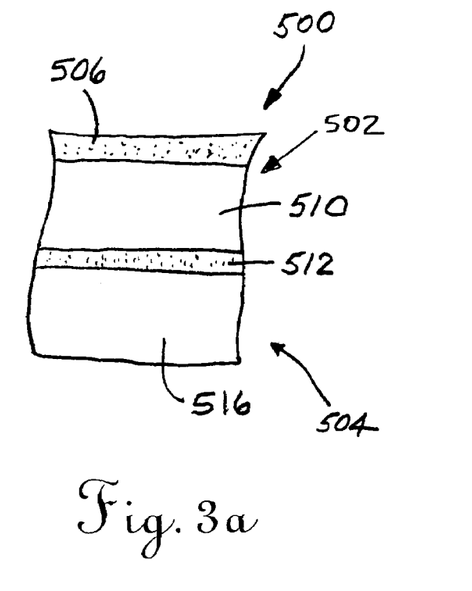
FIGS. 3a-3h are schematical, side elevational illustrations of several possible multilayer thermoplastic blanket material products of the present invention.

FIG. 3*a* discloses a multilayer thermoplastic blanket 500 having a first layer 502 and a second layer 504. The first layer 502 includes a first surface zone 506 and a base or core zone 510. Similarly, the second layer 504 includes a third surface zone 512 and a second base or core zone 516.

As illustrated, the first surface zone 506 of the first layer 502 and the third surface zone 512 of the second layer 504 have been densified. More specifically, each of the densified layers 506, 512 have a density of between about 1.5 to about 30 pcf while the remaining portions of each layer 502, 504 including the first and second base or core zones 510, 516 have a density of between about 0.5 to about 10.0 pcf. Typically, the densified surface zones 506 and 512 have a thickness of between about 0.01 to about 0.1 inches while the first and second base zones have a thickness of between about 0.25 to about 4.0 inches.

Figure 3B:
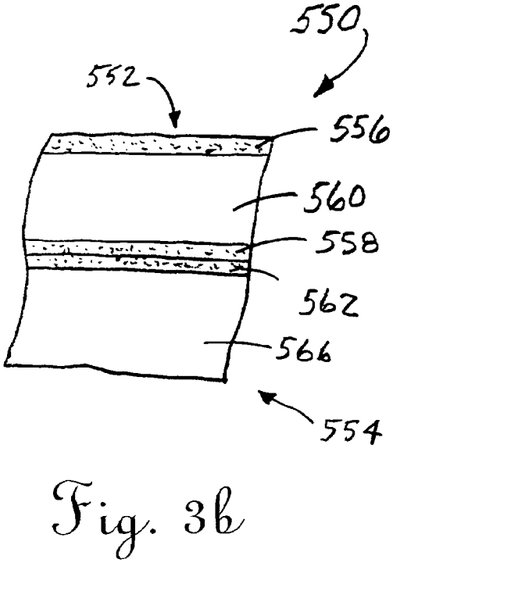

An alternative embodiment of the multilayer of thermoplastic blanket 550 is illustrated in FIG. 3*b*. This embodiment includes a first layer of thermoplastic material 552 and a second layer of thermoplastic material 554. The first layer 552 comprises a first densified surface zone 556, a second densified surface zone 558 and a first base or core zone 560 between the first and second surface zones.

The second layer 554 includes a third densified surface zone 562 and a second base or core zone 566. In this embodiment the densified surface zones 556, 558 and 562 all typically have a density of between about 1.5 to about 30.0 pcf and typically a thickness of between about 0.01 to about 0.1 inches. In contrast, the undensified base or core zones 560, 566 have a lower density relative to the densified surface zones 556, 558 and 562 of between about 0.5 to about 10.0 pcf and a thickness of between about 0.25 to about 4.0 inches.

Figure 3C:
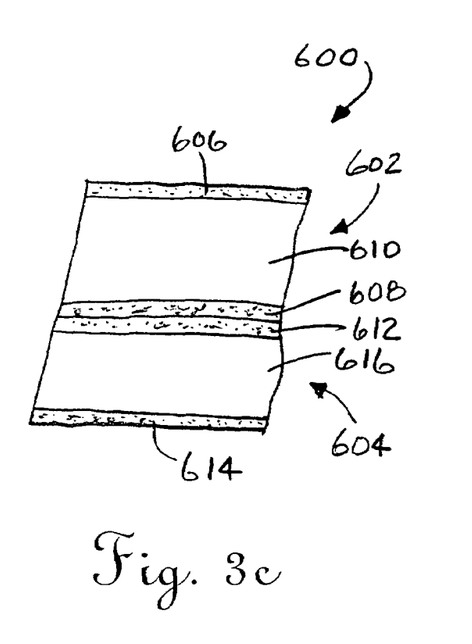

Yet another two layer embodiment of the present invention is illustrated in FIG. 3*c*. In this embodiment, the thermoplastic blanket 600 includes a first layer 602 of thermoplastic material having a first densified surface zone 606, a second densified surface zone 608 and a first base or core zone 610 between the first and second densified surface zones. Similarly, the second layer 604 includes a third densified surface zone 612, a fourth densified surface zone 614 and a second base or core zone 616 between the third and fourth densified surface zones. In this embodiment the densified surface zones 606, 608, 612 and 614 typically have a density of between about 1.5 to about 30.0 pcf and a thickness of between about 0.01 to about 0.1 inches while the base or core zones 610, 616 typically have a density of between about 0.5 to about 10.0 pcf and a thickness of between about 0.25 to about 4.0 inches.

Figure 3D:
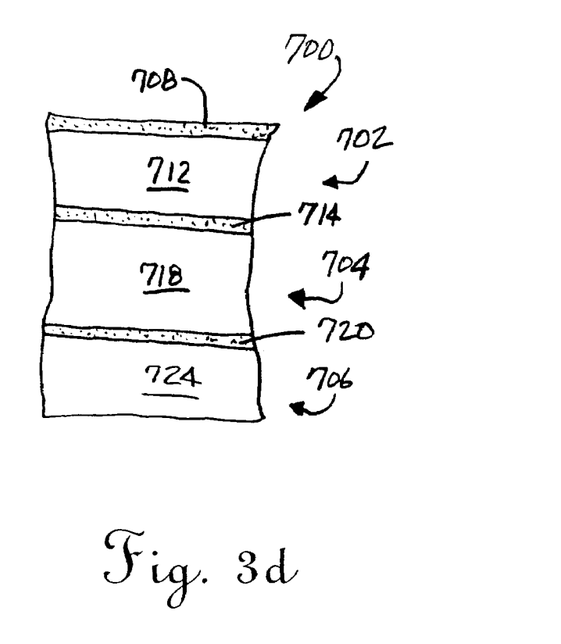

FIGS. 3*d*-3*h* disclose various three-layer embodiments of thermoplastic blankets of the present invention. More specifically, FIG. 3*d* illustrates a thermoplastic blanket 700 including a first layer of thermoplastic material 702, a second layer of thermoplastic material 704 and a third layer of thermoplastic material 706. The first layer 702 includes a first densified surface zone 708 and a base or core zone 712. The second layer 704 includes a third densified surface zone 714 and a second base or core zone 718. Likewise, the third layer 706 includes a fifth densified surface zone 720 and a third base or core zone 724.

In the embodiment illustrated in FIG. 3*d*, the first surface zone 708, third surface zone 714 and fifth surface zone 720 have all been densified and typically have a density of between about 1.5 to about 30.0 pcf and a thickness of between about 0.01 to about 0.1 inches. The remaining undensified base or core zones 712, 718 and 724 have a density of between about 0.5 to about 10.0 pcf and a thickness of between about 0.25 to about 4.0 inches.

Figure 3E:
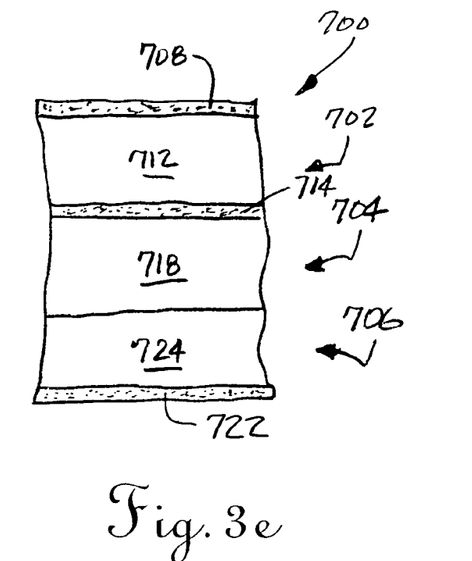

FIG. 3*e* discloses a three-layer embodiment similar to FIG. 3*d* and incorporates the same reference numerals. In this particular embodiment only the first surface zone 708 of the first layer 702, third surface zone 716 of the second layer 704 and sixth surface zone 722 of the third layer 706 are densified.

Figure 3F:
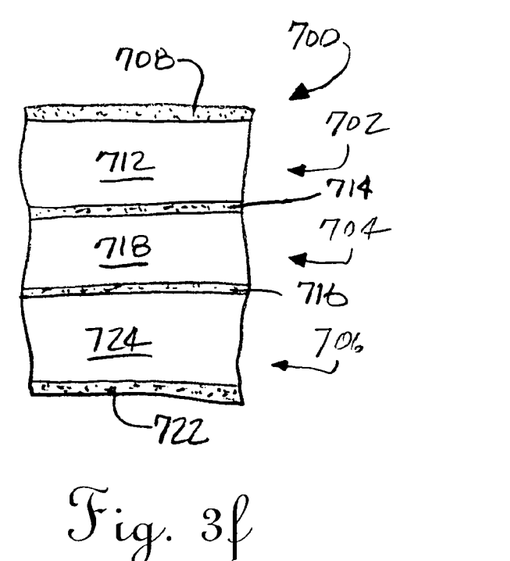

FIG. 3f also illustrates a three-layer embodiment of the thermoplastic blanket 700 of the present invention. FIG. 3f is similar to the embodiments illustrates in FIGS. 3d and 3e except that it incorporates four densified surface zones. Those densified surface zones are the first surface zone 708 of the first layer 702, third surface zone 714 and fourth surface zone 716 of the second layer 704 and sixth surface zone 722 of the third layer 706.

Figure 3G:
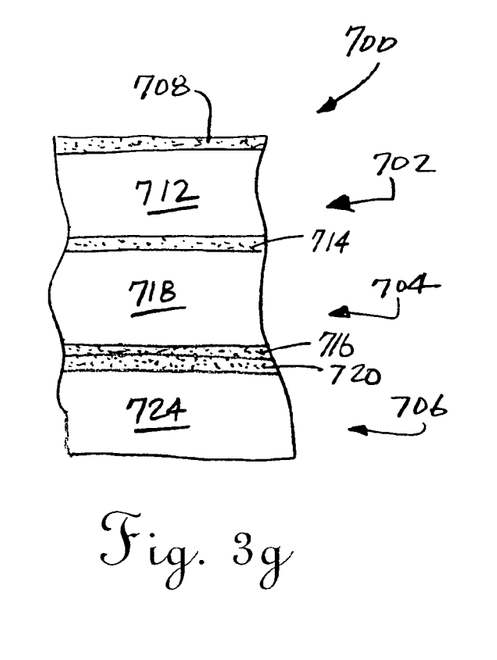

Still another alternative three-layer embodiment of the present invention is illustrated in FIG. 3g. The thermoplastic blanket 700 of FIG. 3b includes a structure similar to those illustrated in FIGS. 3d-3f and, accordingly, incorporates the same reference numerals. In the FIG. 3g embodiment, however, it is the first surface zone 708 of the first layer 702, third surface zone 714 and fourth surface zone 716 of the second layer 704 and the fifth surface zone 720 of the third layer 706 that have been densified.

Figure 3H:
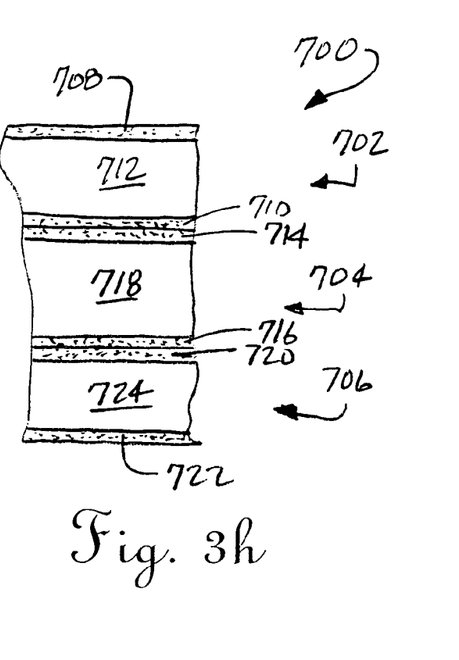

In FIG. 3h, another three-layer embodiment of the present invention is shown. In this embodiment, each layer 702, 704 and 706 includes two densified surface zones. Thus, surface zones 708, 710, 714, 716, 720 and 722 are all densified relative to the core or base zones 712, 718 and 724. The six surface zones 708, 710, 714, 716, 720 and 722 all have a density of between about 1.5 to about 30.0 pcf and a thickness of between about 0.01 and about 0.1 inches. In contrast, the base or core zones 712, 718 and 724 have a lesser density than the surface zones 708, 710, 714, 716, 720 and 722 of about 0.5 to about 10.0 pcf and a thickness of between about 0.25 to about 4.0 inches.

It should be appreciated that the triple layer embodiments illustrated in FIGS. 3d-3h are presented for purposes of illustration and are not to be considered as restrictive of the present invention. For example, embodiments with any five of the six possible surface zones densified are possible. Further, it should be appreciated that either exposed face of the multilayer thermoplastic blankets 500, 550, 600 and 700 illustrated in FIGS. 3a-3h could be covered by a facing layer such as described above with respect to the embodiments illustrated in FIGS. 2a-2d.

Generally, any of the products of the present process including those illustrated in FIGS. 2a-2d and FIGS. 3a-3h may be formed from a polymer based thermoplastic material by means of the equipment and method described in this document. Such a material may be selected from a group including polyester, polyethylene, polypropylene, polyethylene terephthalate, rayon, nylon and any mixtures thereof. The material may also include fibers selected from a group consisting of glass fibers, natural fibers and mixtures thereof.

Facings useful in the final products of the present invention include but are not limited to polyester, rayon, metallic foil and mixtures thereof. As noted above, final products of the present method may even include a core section at least partially constructed from thermoset polymer material, fiber glass, polymer foam, mineral fiber, cardboard and mixtures thereof.

As a result of the unique apparatus and process of the present invention, the final product has a number of unique physical characteristics including a base layer or core section of relatively high loft. Specifically, following processing from a thermoplastic blanket material of starting density D, the base layer or core section may be maintained at an increase in density of no more than about 0—about 40% and more typically 0-15% D. Significantly, this is accomplished while the density of the densified surface layer or layers is up to about two to ten times that of the original density D. Such a product exhibits unique and useful handling, strength and insulating properties.

Multilayer embodiments as illustrated in FIGS. 3a-3h are particularly useful for a number of applications including but not limited to: automotive industry applications such as trunk liners, door insulators or any other location that presently uses high mass materials similar to ethylene vinyl acetate (EVA); appliance applications such as dishwasher blankets, washing machine insulators, appliance floors that absorb and block noise and replacement of EVA type materials; and commercial and interior applications such as partition, wall, ceiling and undercarpet insulators providing much greater sound deadening with less gram weight of polymer material.

More specifically, veil or thin layers of material may be easily densified to provide a specific air flow resistance. Multiple layers of such densified materials may then be combined to yield a higher air flow resistance at least equal to the sum of the individual layers and in many situations a much higher air flow resistance than the sum of the layers. Since it is much easier to control the densification of a layer to achieve a low air flow resistance than it is to achieve a high air flow resistance, this layering approach allows one to more easily and consistently achieve a desired higher air flow resistance for a given product.

For example, a single layer of polymer material is surface treated on one face to achieve a certain air flow resistance. A second layer of material is similarly densified on one face or surface. The two layers are then put together with the two densified surfaces abutting. The stacked layers are then sent back through the apparatus 10 and one or both of the exposed surfaces are densified. This reprocessing allows three or four surface layers to be densified and the layers sandwiched together. The resulting product provides enhanced air flow resistance and acoustical properties and added strength and rigidity. It is, however, still a moldable product and as such can be molded into a desired shape to, for example, nest in a structural part such as a trunk lid.

Advantageously, the resulting multilayered product provides increased acoustic benefit while reducing the amount of material required. Further, the product can be easily custom designed to target specific acoustical frequencies for maximum benefit. In addition, lower frequency acoustical absorption is now possible with polymer materials and manufacturers no longer must utilize heavy EVA or like materials to dampen and block noise. The resulting weight savings are significant.

An example of a multilayer product of the present invention is presented below in detail.

EXAMPLE 1

A high temperature material is densified on the top and bottom surfaces while maintaining a soft core at a fixed height (0.25 to 0.5 inches). Each surface is densified to an air flow resistance of 200-300 Rayls. The soft center material has an air flow resistance of less than 150 Rayls. This high temperature material is then bonded to a low temperature thermoplastic base material that has a known air flow resistance. The resultant material combination can then be molded at a temperature below the softening temperature of the high temperature layer, but above the low temperature base material transition temperature. The cap layer will maintain the higher air flows during the molding process. The molded material has a high air flow cap layer with a base material that gives the material the stiffness. The resulting product may be utilized as a dash insulator in a vehicle.

In summary, numerous benefits result from employing the concepts of the present invention. The method of the present invention allows for continuous in-line operation and has been proven to date at blanket processing speeds of up to 45 ft/min. The apparatus 10 and process allow bonding of different layers of material and/or facings to the copolymer material in-line and even permit the molding of a continuous flat board type product at production line speeds within relatively close tolerances.

In addition, the method effectively provides for densification only at the one or both surfaces of the thermoplastic blanket material while maintaining the loft of the base or core layer. This allows the production of products with a particularly appealing combination of strength and acoustical insulating properties heretofore unavailable in the art.

Each of the heating platens 22, 24, 30 and 32 and the cooling platens 50 are independently temperature controlled. Further, each means 28, 36 and 49 for displacing the platens 22, 30 and 50 respectively are independently controlled. Consequently, the apparatus 10 provides maximum flexibility in processing so that a multitude of different surface densification layers may be provided.

The end product also enjoys enhanced handling characteristics. The densified surface layers are void of loose fibers and consequently such loose fibers are not present to catch on objects and pull out of the blanket during installation in, for example, an appliance or vehicle. Accordingly, polymer dust is significantly reduced.

The densified surface layers greatly increase the rigidity of the end product, and the tensile strength of the blanket material following processing by the present method has been found to increase by a factor of two in both the machine and cross machine directions. This is true even on the lightest of densified surface layers.

The densified surface layers also impart a resilient memory to the final product. Thus, the product may be flexed during installation and then return to proper shape. This is a significant manufacturing benefit. The densified surface layer also presents a very smooth surface with increased contact area for improved lamination results and better graphics presentation.

The following table illustrates the processing of three different starting materials with the method of the present invention.

| Material | Platen Temperature | Speed Feet/minute | Compression | Incoming Material | Finished Loft |
|---|---|---|---|---|---|
| 25 gram Versamat 800 | 450 deg. F. | 35 | .375" | 1.125" | .750" |
| 100 gram Versamat 2000 | 450 deg. F. | 18 | .25" | 1.0" | .750" |
| 60 gram Versamat 2000 | 450 deg. F. | 18 | .375" | .750" | .434" |

The overall thickness of the densified surface layer may be controlled by a number of parameters including the platen temperatures, the processing speed of the thermoplastic blanket material passing through the apparatus and the extent of the compression applied to the thermoplastic blanket material by the platens as that material passes through the treatment zone. Advantageously, by cooling the thermoplastic blanket material to a temperature below the softening temperature of that material prior to that material exiting the treatment zone and the release of the compression provided by the platens, the blanket material sets to a desired thickness within close tolerances. This provides a substantial advantage when utilizing the resulting product as a thermal and/or acoustical insulating component in subsequently manufactured equipment such as in vehicles and appliances.

The foregoing description of the preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A thermoplastic blanket, comprising:
   a first layer of thermoplastic material including a first surface zone and a first base zone, said first surface zone being densified and having a density of between about 1.5 to about 30.0 pcf and a thickness of between about 0.01 to about 0.1 inches and said first base zone having a density of between about 0.5 to about 10.0 pcf and a thickness of between about 0.25 to about 4.0 inches; and
   a second layer of thermoplastic material including a third surface zone and a second base zone, said third surface zone being densified and having a density of between about 1.5 to about 30.0 pcf and a thickness of between about 0.01 to about 0.1 inches and said second base zone having a density of between about 0.5 to about 10.0 pcf and a thickness of between about 0.25 to about 4.0 inches; wherein said third surface zone abuts said first base zone.

2. The thermoplastic blanket of claim 1 wherein said thermoplastic blanket is formed from a polymer based thermoplastic material.

3. The thermoplastic blanket of claim 2, wherein said polymer based thermoplastic material is selected from a group consisting of polyester, polyethylene, polypropylene, polyethylene terephthalate, rayon, nylon, and any mixtures thereof.

4. The thermoplastic blanket of claim 3, wherein said polymer based thermoplastic material includes fibers selected from a group consisting of glass fibers, natural fibers and mixtures thereof.

5. The thermoplastic blanket of claim 1, further including a facing layer on said thermoplastic blanket.

6. The thermoplastic blanket of claim 5, wherein said facing layer is selected from a group consisting of polyester, rayon, metallic foil and mixtures thereof.

7. The thermoplastic blanket of claim 1, wherein said first layer includes a second densified surface zone and said second densified surface zone abuts said third densified surface zone.

8. The thermoplastic blanket of claim 7, further including a first facing layer on said first densified surface zone of said thermoplastic blanket and a second facing layer on said second base zone of said thermoplastic blanket.

9. The thermoplastic blanket of claim 8, wherein said first and second facing layers are selected from a group consisting of polyester, rayon, metallic foil and mixtures thereof.

10. The thermoplastic blanket of claim 8, wherein said second densified surface zone has a density of between about 1.5 to about 30.0 pcf and a thickness of between about 0.01 to about 0.1 inches.

11. The thermoplastic blanket of claim 10, wherein a fourth densified surface zone having a density of between about 1.5 to about 30.0 pcf and a thickness of between about 0.01 to about 0.1 inches is provided between said second base zone and said second facing layer.

12. The thermoplastic blanket of claim 11, further including a third layer of thermoplastic material having a fifth surface zone and a third base zone, said fifth surface zone being densified and having a density of between about 1.5 to about 30.0 pcf and a thickness of between about 0.01 to about 0.1 inches and said third base zone having a density of between about 0.5 to about 10.0 pcf and a thickness of between about 0.25 to about 4.0 inches.

13. The thermoplastic blanket of claim 12, wherein said fourth surface zone abuts said fifth surface zone.

14. The thermoplastic material of claim 13, wherein said fourth surface zone abuts said third base zone.

15. The thermoplastic blanket of claim 10, further including a third layer of thermoplastic material having a fifth surface zone and a third base zone, said fifth surface zone being densified and having a density of between about 1.5 to about 30.0 pcf and a thickness of between about 0.01 to about 0.1 inches and said third base zone having a density of between about 0.5 to about 10.0 pcf and a thickness of between about 0.25 to about 4.0 inches.

16. The thermoplastic blanket of claim 1, wherein said first and second base zones are at least partially constructed from material selected from a group consisting of thermoset polymer material, fiber glass, foam, mineral fiber, cardboard and mixtures thereof.

17. The thermoplastic blanket of claim 1, further including a third layer of thermoplastic material having a fifth surface zone and a third base zone, said fifth surface zone being densified and having a density of between about 1.5 to about 30.0 pcf and a thickness of between about 0.01 to about 0.1 inches and said third base zone having a density of between about 0.5 to about 10.0 pcf and a thickness of between about 0.25 to about 4.0 inches.

18. The thermoplastic blanket of claim 17, wherein said fifth surface zone abuts said second base zone.

19. The thermoplastic material of claim 17 wherein said fifth surface zone abuts said third surface zone.

20. The thermoplastic material of claim 17, wherein said third layer includes a sixth densified surface zone having a density of between about 1.5 to about 30.0 pcf and a thickness of between about 0.01 to about 0.1 inches.

* * * * *